(12) United States Patent
Manners (10) Patent No.: US 7,849,883 B2
(45) Date of Patent: Dec. 14, 2010

(54) LINER ASSEMBLY FOR PIPELINE REPAIR AND METHODS OF INSTALLING SAME

(75) Inventor: Cameron Manners, Oshawa (CA)

(73) Assignee: NuFlow Technologies 2000 Inc., Oshawa, Ontario (CA)

(*) Notice: Subject to any disclaimer, the term of this patent is extended or adjusted under 35 U.S.C. 154(b) by 1216 days.

(21) Appl. No.: 11/120,040

(22) Filed: May 2, 2005

(65) Prior Publication Data
US 2006/0243337 A1  Nov. 2, 2006

(51) Int. Cl.
*F16L 55/16* (2006.01)
(52) U.S. Cl. ........................ 138/98; 138/97; 405/184.2; 405/150.1
(58) Field of Classification Search .................... 138/97, 138/98; 405/184.2, 150.1
See application file for complete search history.

(56) References Cited

U.S. PATENT DOCUMENTS

| | | | | |
|---|---|---|---|---|
| 1,760,750 A | * | 5/1930 | Goodman | 138/93 |
| 3,914,825 A | | 10/1975 | Reynolds | 24/115 R |
| 3,958,607 A | * | 5/1976 | Gray | 138/97 |
| 4,029,428 A | | 6/1977 | Levens | 408/127 |
| 4,167,358 A | | 9/1979 | Besha | 405/87 |
| 4,207,130 A | | 6/1980 | Barber | 156/244.13 |
| 4,245,970 A | | 1/1981 | St. Onge | 425/13 |
| 4,351,349 A | | 9/1982 | Minotti | 137/15 |
| 4,366,012 A | | 12/1982 | Wood | 156/93 |
| 4,467,835 A | * | 8/1984 | Champleboux | 138/93 |
| 4,778,553 A | | 10/1988 | Wood | 156/287 |
| 4,995,761 A | * | 2/1991 | Barton | 405/184.1 |
| 5,044,405 A | | 9/1991 | Driver et al. | 138/98 |
| 5,167,258 A | | 12/1992 | Rice | 138/98 |
| 5,223,189 A | | 6/1993 | Friedrich | 264/31 |
| 5,322,653 A | | 6/1994 | Muller | 264/35 |
| 5,329,063 A | | 7/1994 | Endoh | 138/98 |
| 5,354,586 A | | 10/1994 | Yokoshima et al. | 428/36.1 |
| 5,379,802 A | * | 1/1995 | VanderLans | 138/89 |
| 5,501,248 A | | 3/1996 | Kiest, Jr. | 138/98 |
| 5,628,345 A | | 5/1997 | Fisco | 138/98 |
| 5,692,543 A | | 12/1997 | Wood | 138/98 |
| 5,706,861 A | | 1/1998 | Wood et al. | |
| 5,765,597 A | | 6/1998 | Kiest, Jr. et al. | 138/78 |
| 5,794,663 A | | 8/1998 | Kiest, Jr. et al. | 138/98 |
| 5,855,729 A | | 1/1999 | Kiest, Jr. et al. | 156/423 |
| 5,927,341 A | | 7/1999 | Taylor | 138/98 |

(Continued)

FOREIGN PATENT DOCUMENTS

EP  0 241 719  7/1991

(Continued)

OTHER PUBLICATIONS

European Search Report dated Mar. 5, 2009 in corresponding European Application No. 06252321.2.

*Primary Examiner*—James F Hook
(74) *Attorney, Agent, or Firm*—Baker & Daniels LLP (57) ABSTRACT

A liner assembly for pipeline repair and methods of installing same. The liner assembly generally comprises an outer tubular liner, an inner malleable inflatable bladder positioned longitudinally within said liner, and a generally non-stretchable strap positioned longitudinally within the malleable inflatable bladder. The generally non-stretchable strap restricts longitudinal over-expansion during positioning and inflation of the liner assembly within a pipeline.

24 Claims, 10 Drawing Sheets

U.S. PATENT DOCUMENTS

| | | | | |
|---|---|---|---|---|
| 5,950,682 A | | 9/1999 | Kiest, Jr. | 138/98 |
| 5,964,249 A | | 10/1999 | Kiest, Jr. | 138/98 |
| 5,964,288 A | * | 10/1999 | Leighton et al. | 166/207 |
| 6,019,136 A | | 2/2000 | Walsh et al. | 138/98 |
| 6,021,815 A | | 2/2000 | Kiest, Jr. et al. | 138/98 |
| 6,024,910 A | * | 2/2000 | Kamiyama et al. | 264/516 |
| 6,039,079 A | | 3/2000 | Kiest, Jr. | 138/98 |
| 6,105,619 A | | 8/2000 | Kiest, Jr. | 138/98 |
| 6,199,591 B1 | | 3/2001 | Kiest, Jr. et al. | |
| 6,206,993 B1 | | 3/2001 | Kiest, Jr. et al. | |
| 6,276,398 B1 | | 8/2001 | Lange | 138/98 |
| 6,568,429 B2 | * | 5/2003 | Lundman | 138/91 |
| 6,619,886 B1 | | 9/2003 | Harrington | |
| 6,691,741 B2 | | 2/2004 | Manners | 138/98 |
| 7,018,691 B2 | | 3/2006 | McNeil | |
| 7,052,567 B1 | * | 5/2006 | Blackmore et al. | 156/94 |
| 7,523,764 B2 | * | 4/2009 | Lepola et al. | 138/98 |
| 2002/0157784 A1 | | 10/2002 | Kiest, Jr. | |
| 2004/0247810 A1 | | 12/2004 | McNeil | |
| 2005/0133105 A1 | * | 6/2005 | Criffo' | 138/98 |
| 2006/0130923 A1 | * | 6/2006 | Lepola et al. | 138/98 |

FOREIGN PATENT DOCUMENTS

| | | |
|---|---|---|
| EP | 0 518 521 | 9/1996 |
| EP | 0 789 179 | 8/1997 |
| EP | 0 887 584 | 12/1998 |
| JP | 07-280163 | 10/1995 |
| WO | WO 93/16320 | 8/1993 |
| WO | WO 95/08737 | 3/1995 |
| WO | 97/08487 | 3/1997 |
| WO | 98/55796 | 12/1998 |
| WO | 99/10622 | 3/1999 |
| WO | 03/106881 | 12/2003 |

\* cited by examiner

LINER ASSEMBLY FOR PIPELINE REPAIR AND METHODS OF INSTALLING SAME

FIELD OF THE INVENTION

The present invention generally relates to pipeline repair and/or reinforcement and in particular to a liner assembly for pipeline repair and methods of installing the same.

BACKGROUND OF THE INVENTION

Liners are commonly used to repair and/or reinforce ruptured or weak areas in pipeline networks such as sewer systems and the like. Lateral pipes i.e. those extending from a main pipe, are especially susceptible to damage and have traditionally been repaired by conventional excavation methods. As will be appreciated, excavation methods are expensive, time consuming and disruptive.

To avoid the problems associated with excavation methods, "cure-in-place" pipeline repair technology has been developed to allow pipelines to be repaired without requiring disruptive excavation. During "cure-in-place" pipeline repair, a resin impregnated liner is delivered to the pipeline section to be repaired and is maintained in place at that location until the curing process is complete.

A variety of installation systems for delivering "cure-in-place" liners to pipeline sections to be repaired are used in the industry. For example, the liner may be pushed along the pipeline to its desired location by means of a series of push-rods. As will be appreciated, transitional areas along the pipeline such as bends and/or fittings create significant delivery problems as the push-rods are unable to effectively move beyond these transitional areas. Alternatively, and more commonly used in the industry, the liner may be pulled along the pipeline to its desired location using a winch and cable. U.S. Pat. No. 6,691,741 to Manners shows a pull-in liner delivery method wherein an inflatable bladder/resin impregnated felt liner assembly is pulled into the pipeline to repair a damaged pipeline section. Inversion delivery where a liner is unrolled through itself by applied pressure as it projects forwardly into a pipeline has also been considered. U.S. Pat. No. 4,366,012 to Wood shows an inversion delivery process wherein a felt liner, impregnated with uncured resin is inverted into a pipeline in need of repair.

The installation of resin-impregnated liners in pipelines presents certain challenges. For both push-in and pull-in delivery methods, excessive friction during positioning of the liner imparts longitudinal stresses on the liner, often resulting in stretching of the liner. This stretching is undesirable as it may result in weak regions of lined pipeline, and increase the likelihood of future failure of the repaired pipeline section. With respect to inversion delivery methods, due to the considerable pressures used to unroll the liner, liner rupture is not uncommon. This rupture problem is more prevalent when installing longer liners as greater pressures are required during liner installation.

Pipelines containing bends (i.e. 22°, 45°, 90°) and/or other fittings (i.e. Y- and T-junctions) present additional challenges. As practitioners in the industry are aware, liners delivered by prior art installation systems are generally prone to creasing in these areas of transition. Creases disrupt fluid flow and may initiate an obstruction in the pipeline. Proper installation of the liners requires the liners to be smoothly and evenly urged into contact against the inner surface of the pipeline to be repaired. Conventional PVC/vinyl inflatable bladders used in prior art installation systems to urge liners into contact with the inner surface of the pipeline in transitional areas have been found to be deficient due to the nonmalleable nature of these inflatable bladders. As a result, these inflatable bladders often introduce folds and/or creases into the liners in these transitional areas. There is clearly a need for an improved liner assembly that can accommodate a wide variety of pipeline configurations.

It is therefore an object of the present invention to obviate or mitigate at least one of the above described disadvantages.

SUMMARY OF THE INVENTION

Accordingly, in one aspect there is provided a liner assembly for pipeline repair comprising:
   an outer tubular liner;
   an inner malleable inflatable bladder positioned longitudinally within said liner; and
   a generally non-stretchable strap positioned longitudinally within the malleable inflatable bladder, said strap restricting longitudinal over-expansion during positioning and inflation of the liner assembly within a pipeline.

According to another aspect of the present invention, provided is a liner kit for installing a liner in a pipeline, the kit comprising:
   the liner assembly as defined above;
   a pair of non-stretchable retaining sleeves for insertion into each end of a liner assembly for preventing radial over-expansion during inflation of the liner assembly;
   a pull block for insertion into one end of the liner assembly, allowing for a pulling device to be attached to the liner assembly;
   an inflation block for insertion into a second end of the liner assembly, allowing for inflation of the malleable inflatable bladder; and
   a resin kit comprising components for preparing a resin for wetting said felt liner prior to installation.

According to a further aspect of the present invention, provided is a method of installing a prepared liner assembly in a pipeline, comprising the steps of:
   pulling a prepared liner assembly carrying a wetted liner into position in said pipeline, said liner assembly including an outer felt liner tube, an inner malleable inflatable bladder positioned longitudinally within said felt liner tube, and a non-stretchable strap positioned longitudinally within the inflatable bladder, said non-stretchable strap being fixed to each end of said liner assembly to restrict longitudinal over-expansion during positioning and inflation of the liner assembly within said pipeline;
   introducing fluid into said malleable inflatable bladder so that said malleable inflatable bladder expands to bring said outer felt liner tube into firm contact with interior surfaces of the pipeline;
   maintaining said liner assembly in an inflated condition for a time period sufficient for the outer felt liner tube to cure;
   deflating said malleable inflatable bladder and retrieving said malleable inflatable bladder from the liner assembly.

According to yet another aspect of the present invention, provided is a liner assembly for installing a liner at a junction between a main pipe and a lateral pipe, said liner assembly comprising:
   a malleable inflatable bladder assembly for carrying a liner, said malleable inflatable bladder assembly including a main portion and a lateral portion;
   a flow through carrier contained within said main portion; and
   a non-stretchable strap within said lateral portion, wherein said non-stretchable strap is fixed at one end to said flow through carrier contained in said main portion, and adapted on an opposing end to be fixed to the end of said lateral portion of said liner assembly during preparation for installation, said non-stretchable strap serving to restrict longitudinal over-expansion of the lateral portion during positioning and inflation of the liner assembly within a pipeline.

According to further aspect of the present invention, provided is a method of installing a liner having main and lateral portions at a junction between main and lateral pipes, said method comprising the steps of:

pulling a prepared liner assembly into said pipeline, said liner assembly comprising a malleable inflatable bladder assembly for carrying a wetted liner, said malleable inflatable bladder assembly including a main portion and a lateral portion, said main portion containing a flow through carrier, said lateral portion containing a non-stretchable strap extending from said flow through carrier to a sealed end of the lateral portion, said non-stretchable strap serving to restrict longitudinal over-expansion of the lateral portion during positioning and inflation of the liner assembly within a pipeline;

introducing fluid into said malleable inflatable bladder assembly to inflate said assembly so that said assembly expands to bring said wetted liner into firm contact with interior surfaces of the main and lateral pipes and conform said wetted liner to the shape of said junction;

maintaining said malleable inflatable bladder assembly in an inflated condition for a time period sufficient for said wetted liner to cure;

deflating said malleable inflatable bladder assembly; and retrieving said bladder assembly from said pipeline by pulling said bladder assembly from said liner.

BRIEF DESCRIPTION OF THE DRAWINGS

Embodiments will now be described more fully with reference to the accompanying drawings in which.

DESCRIPTION OF THE PREFERRED EMBODIMENTS

The liner assembly is generally provided in stock manufactured lengths, preferably provided on a roll, with required lengths being cut from stock. The liner assembly is generally dimensioned to suit lateral pipelines ranging from 1 ½ inches up to 6", but smaller or larger diameters (i.e. for use in mainlines) can be used. The liner assembly provides a convenient pre-assembled unit wherein a malleable inflation bladder is pre-positioned within a liner during manufacture. In use, the liner assembly is cut to size with the ends of the liner assembly being trimmed and sealed with the appropriate installation gear. The liner assembly is then impregnated with a resin, and subsequently positioned and inflated to repair a damaged section of pipeline. The liner assembly also provides a pre-positioned generally non-stretchable strap extending the length of the liner assembly, the strap being fixed at each sealed end, thus serving to prevent longitudinal stretching of the malleable inflatable bladder and liner during positioning within a pipeline.

Figure 1:
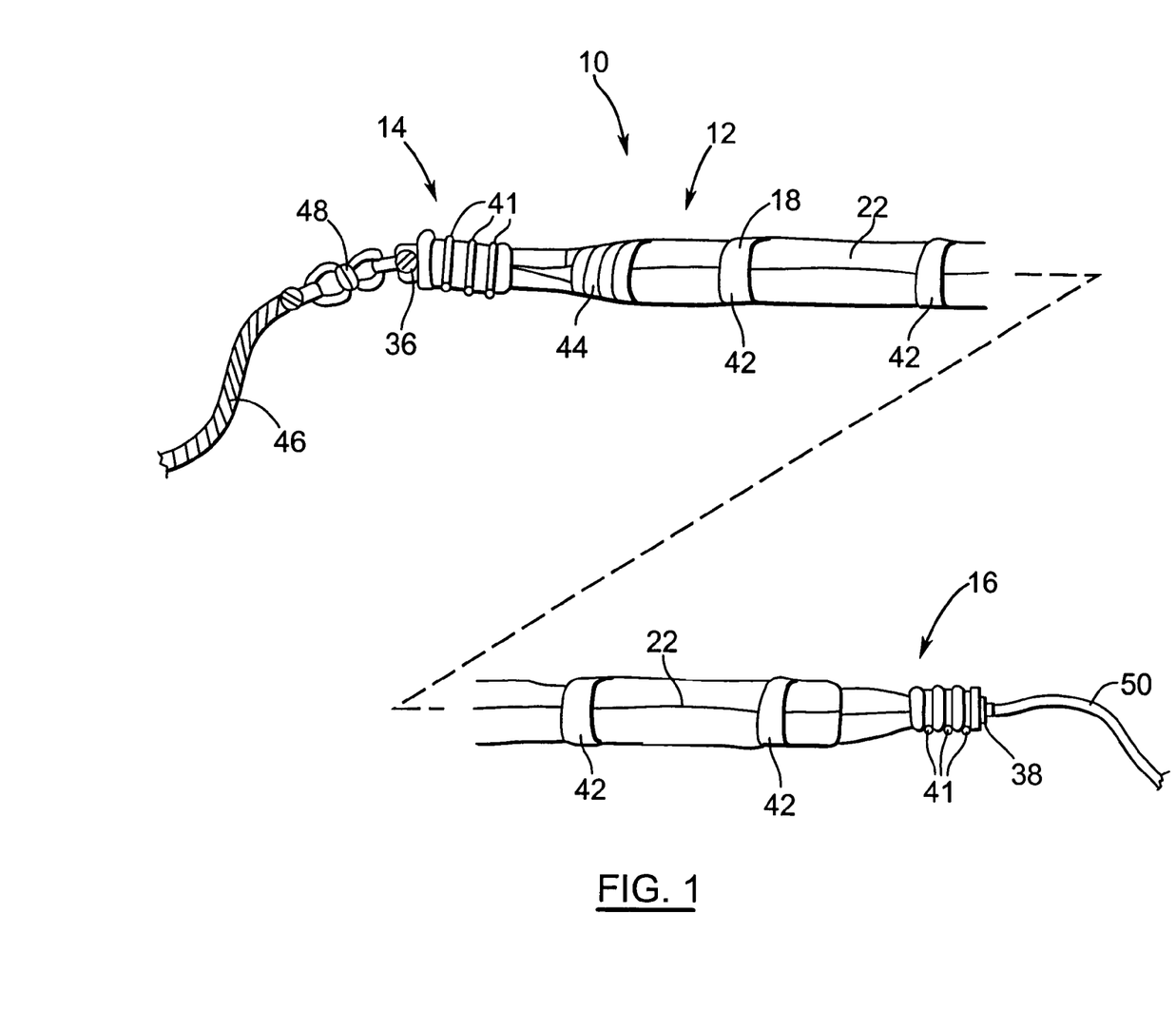
FIG. 1 is a side view of a liner assembly for pipeline repair.

Turning now to FIG. 1, a complete liner assembly is shown and is generally identified by reference numeral 10. As can be seen, the liner assembly 10 includes a liner segment 12, an installation end 14 at one end of the liner segment 12, and an inflation end 16 at the opposite end of the liner segment 12. To facilitate positioning of the liner assembly 10 in the pipeline, the installation end 14 is fitted with a pull block 36 that enables attachment of a suitable pull mechanism (i.e. a winch). The liner assembly is further fitted with an inflation block 38 at the inflation end 16, so as to allow the interior area of the liner assembly 10 to be inflated. The liner segment 12 is longitudinally folded over itself and bound at twelve (12) to eighteen (18) inch intervals using tape 18. Tapered sections 44 are also formed on the liner assembly 10. This arrangement of the longitudinal folds and the tapered sections allows the liner assembly to be manipulated and moved to the correct location in the pipeline.

Figure 2:
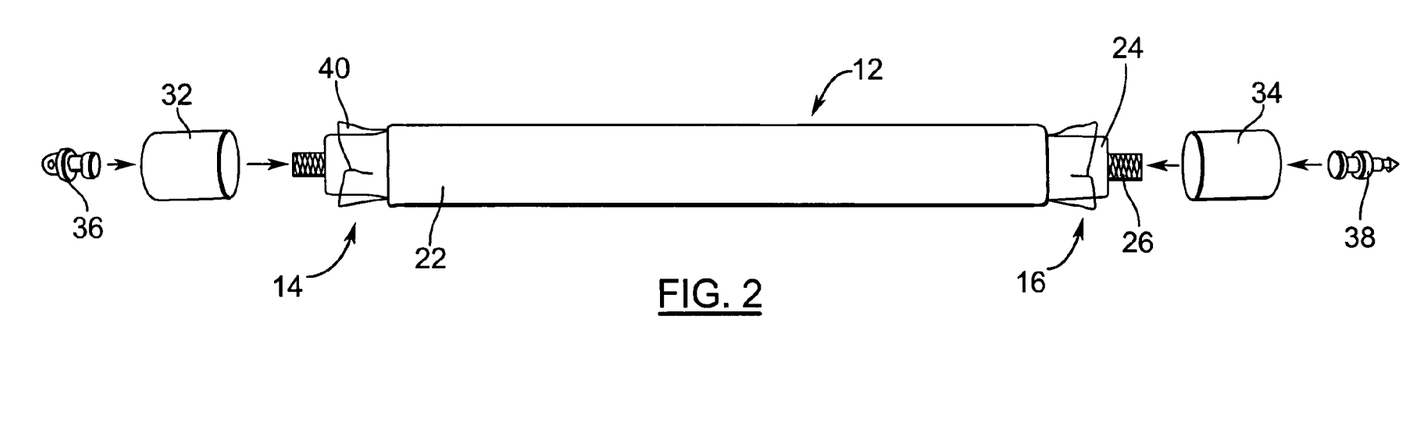
FIG. 2 is an exploded perspective view of a portion of the liner assembly.
Figure 3:
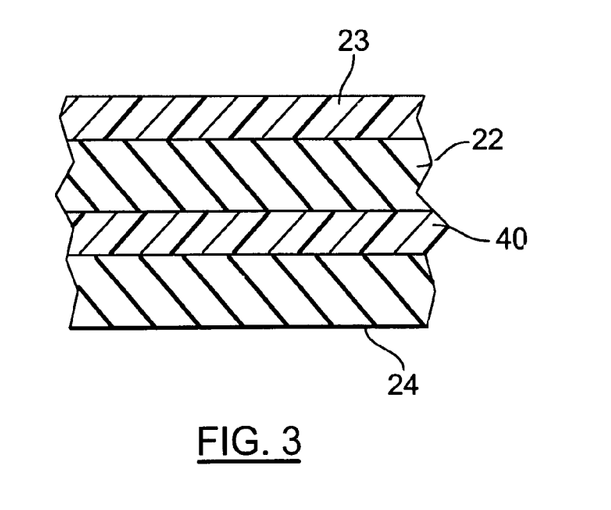
FIG. 3 is a sectional view of another portion of the liner assembly of FIG. 1.

FIG. 2 better illustrates the liner segment 12. As can be seen, liner segment 12 is multi-layered, comprising an outer felt liner tube 22, an elongate malleable inflatable bladder 24 positioned therethrough, and a non-stretchable strap 26 positioned within and along the length of the inflatable bladder 24. The liner assembly, as better represented in partial cross-section in FIG. 3, further comprises a plastic sheathing 23 over the outer surface of the outer felt liner tube 22, and generally also comprises a release plastic 40 positioned between the outer felt liner tube 22 and the elongate malleable inflatable bladder 24. Note that while the plastic sheathing 23 may be fitted to the outside circumference of the outer felt liner tube 22, in this embodiment it is adapted to have a second longitudinal edge overlap a first longitudinal edge by approximately 1.5 inches. To maintain the plastic sheathing in place, the overlap may be temporarily tack welded. The malleable inflatable bladder 24 is generally formed of rubber or silicone, while the non-stretchable strap 26 is generally formed from woven nylon or vinyl. It will be appreciated, however, that a skilled person in the art may choose to use a suitable substitute material for the above noted inflatable bladder 24 and/or strap 26. It will also be appreciated that while the liner tube 22 is generally referred to in this description as being constructed of felt, one skilled in the art may choose to use an alternate substitute material. Also shown in FIG. 2 is a pair of non-stretchable retaining sleeves 32, 34 as well as the pull block 36 and the inflation block 38. The retaining sleeves 32, 34 are generally made of woven nylon or vinyl, but suitable alternatives may be readily implemented as determinable by one skilled in the art.

To repair a damaged section of pipeline, using methods known in the art, the length of liner required is first determined. To ensure the liner assembly 10 covers the areas of the pipeline to be repaired, and so that into the liner assembly incorporates a sufficient length of liner that permits trimming and fitting of the appropriate installation gear, generally an extra length (i.e. 10" (250 mm)) is added to each end. A segment of liner assembly of appropriate length is then cut and prepared as shown in FIG. 2.

As can be seen in FIG. 2, a portion of the outer felt liner tube 22 and plastic sheathing 23 of the liner segment 12 is cut back to expose a length of inflatable bladder 24, and where applicable, release plastic 40. Note that for liners up to 2" in diameter, a release plastic may not be provided. As shown with respect to FIG. 3, release plastic 40 surrounds the inflatable bladder 24 along its entire length, and serves to facilitate easy removal of the inflatable bladder 24 following installation. For smaller diameter liners (up to 4"), generally 6" of exposed inflatable bladder is sufficient. For larger diameter liners, generally 9" of exposed inflatable bladder is sufficient. The liner assembly is then further trimmed to expose a length (i.e. 4") of strap 26 at each end 14, 16.

Figure 4A:
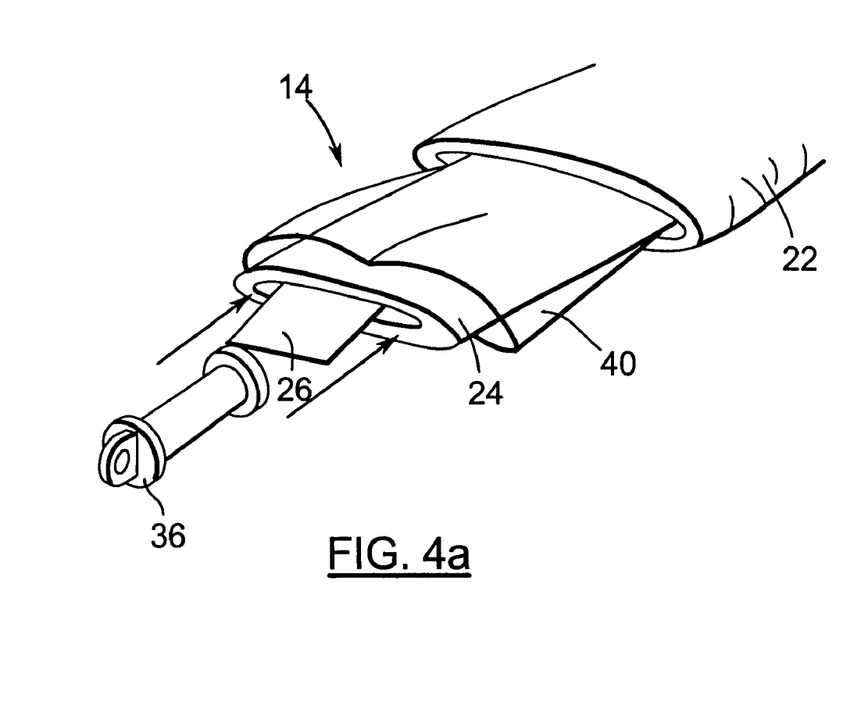
FIGS. 4a and 4b are perspective views showing installation of a pull block during assembly of the liner assembly.
Figure 4B:
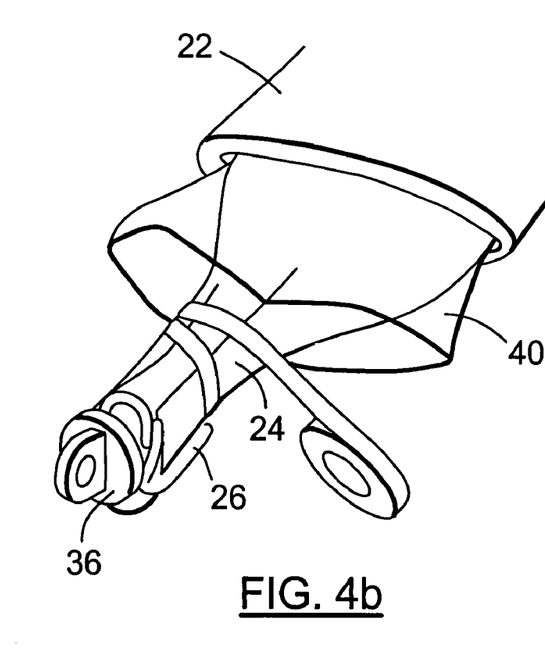

To prepare the segment of trimmed liner assembly for installation, installation end 14 and inflation end 16 are sealed with suitable installation gear. As shown in FIG. 4a, at installation end 14, the pull block 36 is inserted into the inflatable bladder 24. The inflatable bladder 24 in the region surrounding the inserted pull block 36 is subsequently folded in or cinched (as shown in FIG. 4b), onto the pull block 36, ensuring a generally tight fit, sufficient to allow inflation of the inflatable bladder later in the procedure. While preparing installation end 14, strap 26 is tightly incorporated into the folds of the inflatable bladder, or into the taping used to securely maintain this arrangement at installation end 14, as shown in FIG. 4b. Alternatively, strap 26 may be firmly attached to pull block 36, with the inflatable bladder 24 being folded in or cinched as described above. Inflation end 16 is similarly prepared (not shown), substituting inflation block 38 for the pull block 36. As is the case for the installation end 14, strap 26 is tightly incorporated into the folds or taping at inflation end 16, or alternatively attached directly to inflation block 38.

Figure 5A:
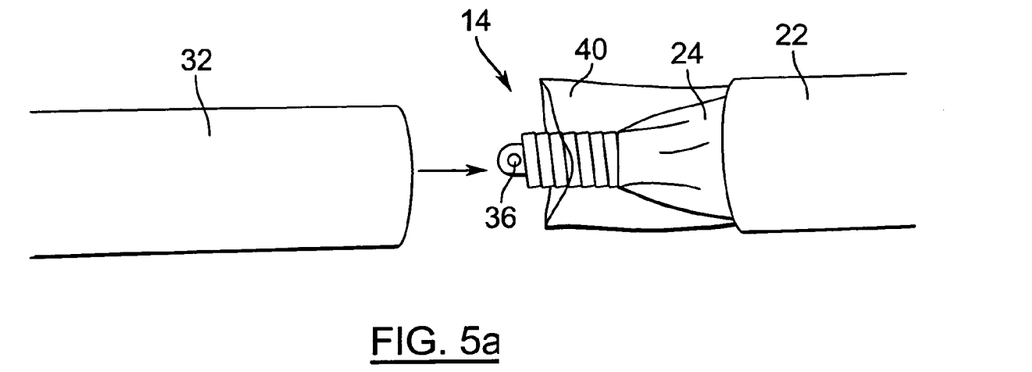
FIGS. 5a to 5c are perspective views showing installation of a retaining sleeve during assembly of the liner assembly.
Figure 5B:
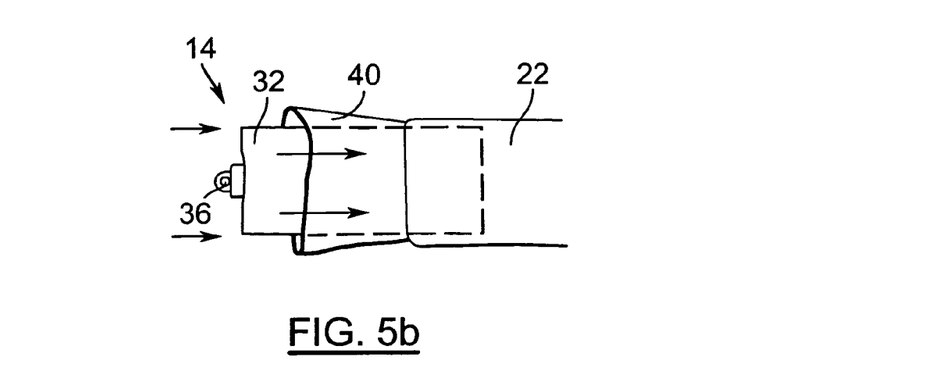
Figure 5C:
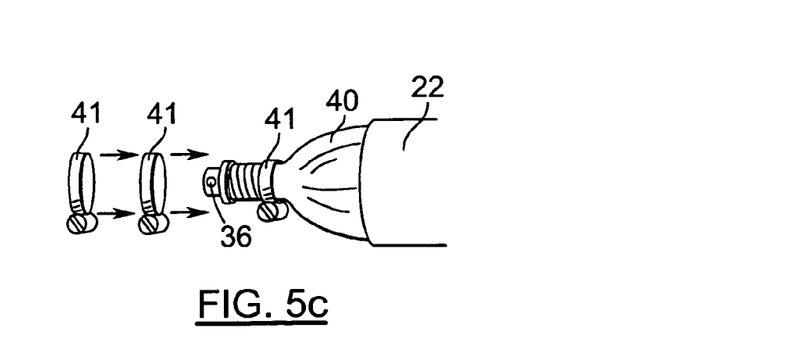

With both ends 14, 16 sealed with the appropriate installation gear, each end 14, 16 is further prepared by inserting between the inflatable bladder 24 and the outer felt liner tube 22 a retaining sleeve 32, 34 (see FIG. 5a; only end 14 and retaining sleeve 32 represented). The retaining sleeve 32, 34 is cut to a length that starts at the front edge of the installation gear (pull block 36 or inflation block 38) and reaches up into the liner at least 6" (See FIG. 5b). For liners having release plastic 40, the retaining sleeve 32, 34 is positioned between the release plastic 40 and the inflatable bladder 24. As shown in FIG. 5c, at each end 14, 16, the retaining sleeve 32, 34 and release plastic 40 is folded in, over the taped ends previously prepared, and securely taped. Each end 14, 16 is then further secured using suitable clamps 41 (i.e. gear clamps) to ensure a tight fit around the blocks positioned therein.

While the above description teaches ends 14, 16 being sealed in two stages (i.e. first taped and secondly clamped), the process is merely exemplary and a person skilled in the art may choose to seal each end about the respective gear in an alternate suitable manner so as to achieve substantially sealed ends.

With the liner assembly sealed at both ends 14, 16 with the appropriate installation gear, the outer felt liner tube 22 is impregnated with an appropriate resin (i.e. epoxy). The process of impregnating the outer felt liner tube 22 is commonly referred to as "wetting". To wet the outer felt liner tube, a portion of the resin is delivered to the space between the outer felt liner tube 22 and the inflatable bladder 24. If a release plastic 40 is provided, the resin is delivered to the space immediately adjacent the outer felt liner tube 22. To move the resin slug through the liner assembly 10, rollers are used in a manner known in the art. To ensure a complete wet out procedure, it is helpful to apply excess resin to both ends of the outer felt liner tube 22.

After the outer felt liner tube 22 of the liner assembly 10 has been wetted, the plastic sheathing 23 on the outside surface of the outer felt liner tube 22 is scored to facilitate migration of the resin out of the outer felt liner tube 22. Contact of the resin with the pipeline being repaired ensures that the liner being installed is fixed in place. The outside surface of plastic sheathing 23 is then wiped to ensure a clean dry surface. Referring back to FIG. 1, the liner assembly is then longitudinally folded and taped at approximately 12 to 18" intervals 42 to retain this folded arrangement. To facilitate entry and/or movement of the liner assembly in a pipeline, the leading edge of the outer felt liner tube 22 is taped to form a tapered configuration 44. To facilitate the release of the inflatable bladder, a silicone release gel may be added to each end 14, 16 of the liner assembly. To installation end 14, a winch cable 46 is attached to pulling block 36, with the optional use of devises 48. To inflation end 16, an air line 50 is attached to inflation block 38.

Figure 6A:
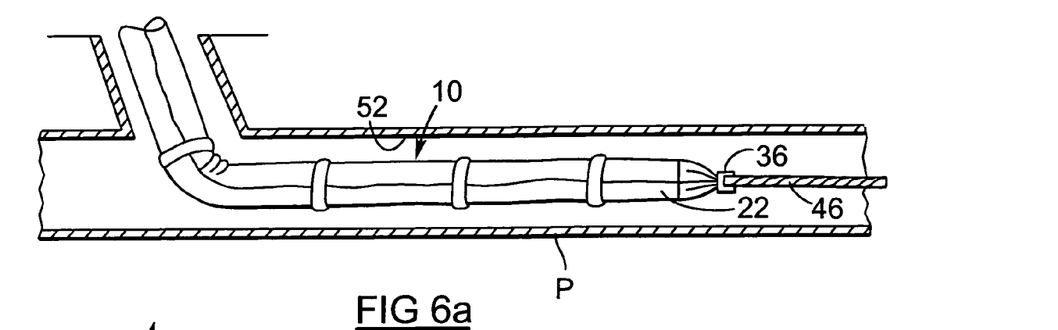
FIGS. 6a to 6c are side views, partly in section, showing installation of the liner assembly into a pipeline to be repaired.
Figure 6B:
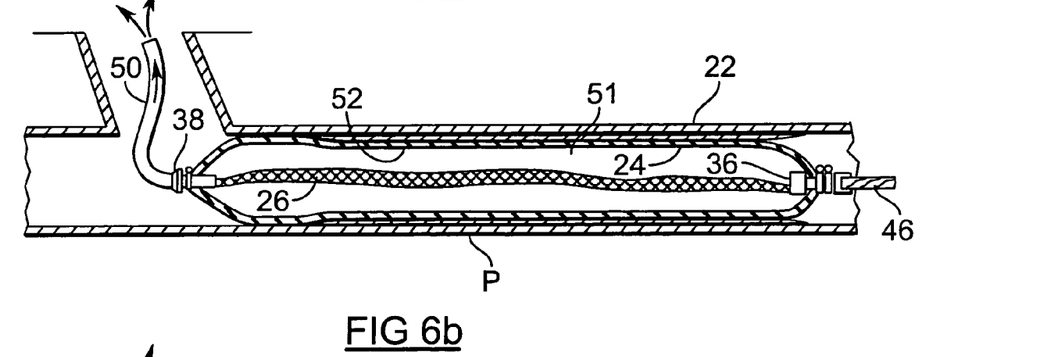

FIGS. 6a through 6c show the liner assembly 10 in a linear section of pipeline. To install the liner assembly, a winch (not shown) is used to pull the liner assembly into a pipeline P to be repaired and/or reinforced via winch cable 46, as shown in FIG. 6a. Once the liner assembly is at the desired location within the pipeline, an air pump (not shown) is operated to supply air through air line 50, connected to inflation block 38. Air fed through the air line 50 passes through inflation block 38 and into the internal reservoir 51 of the inflatable bladder 24. The inflatable bladder 24 is inflated until the liner assembly 10 expands to the point where the outer felt liner tube 22 is urged against and firmly contacts the interior surface 52 of the pipeline as shown in FIG. 6b. During inflation, the taped portions of the liner assembly release, allowing the liner assembly, and surrounding plastic sheathing 23 to expand and contact the interior surface 52. The liner assembly is then maintained in this condition for a time period sufficient to enable the wetted outer felt liner tube to cure.

Figure 6C:
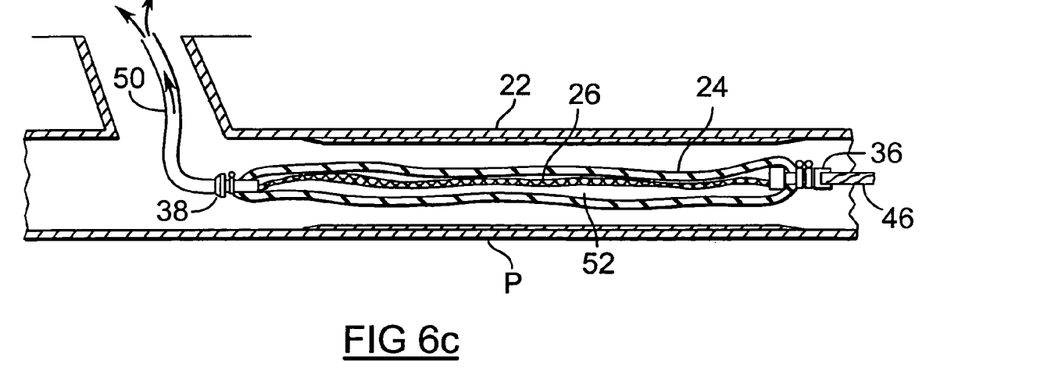

Following curing of the outer felt liner tube 22, the air within the internal reservoir 51 is released through the inflation block 38 and air line 50 (see FIG. 6c). To facilitate this process, the air pump may be used to evacuate air from the internal reservoir, allowing the inflatable bladder 24 to resume its natural flat state. Once evacuated, the inflatable bladder is then withdrawn from the pipeline via winch cable 46, leaving the cured outer felt liner tube 22 in position within the pipeline.

The appropriate air pressure for inflating the inflatable bladder 24 depends on the diameter of the liner assembly. In general, liner assemblies having a diameter ranging from 3" to 6" are inflated to approximately 12 to 15 pounds per square inch (psi). Liner assemblies of smaller diameter (i.e. 1 ½" and 2" liners) are inflated to approximately 24 psi. During the inflation process, the air pressure should be sufficient to break the tape 42 spaced along the longitudinally folded liner assembly, allowing the liner assembly to fill the pipeline being repaired.

Although the installation of the liner assembly has been shown with respect a linear section of pipeline, the liner assembly may also be used to install a liner in a bent section of pipeline. The ability of the liner assembly to adapt to bends (i.e. 22°, 45°, 90°) is provided by the malleable nature of the inflatable bladder used in the liner assembly. As the liner assembly is inflated in a transitional area, the bladder not only stretches to accommodate the air pressure contained therein, but conforms to the bend so as to ensure the resin-impregnated liner is urged into contact with all surfaces of the transitional area. The inflatable bladder achieves this by allowing variable stretching, i.e. stretching less at the inside edge while stretching more at the outside edge of the bend. Prior art systems that used woven nylon or vinyl bladder systems could not achieve this variable stretching, ultimately resulting in creases and/or folds being formed in the resin-impregnated and resultant cured liner. The reduction and/or elimination of these creases results in greater fluid flow in the repaired section and well as a reduction in the likelihood of debris retainment and possible obstruction.

Turning now to FIGS. 7 to 10, an alternative embodiment of a liner assembly for installing a liner at a T-junction within a pipeline is shown and is generally identified by reference numeral 100. As can be seen, the liner assembly 100 includes a T-shaped malleable bladder assembly 102 having a main portion 104 and a lateral portion 106 connected by a fused T-joint 108. The lateral portion 106 further comprises a release plastic 110 and a non-stretchable strap 112. The main portion 104 further comprises a flow-through carrier 114 extending therethrough. Strap 112 is fused to the flow-through carrier 114 in the region of the fused T-joint 108.

Figure 7A:
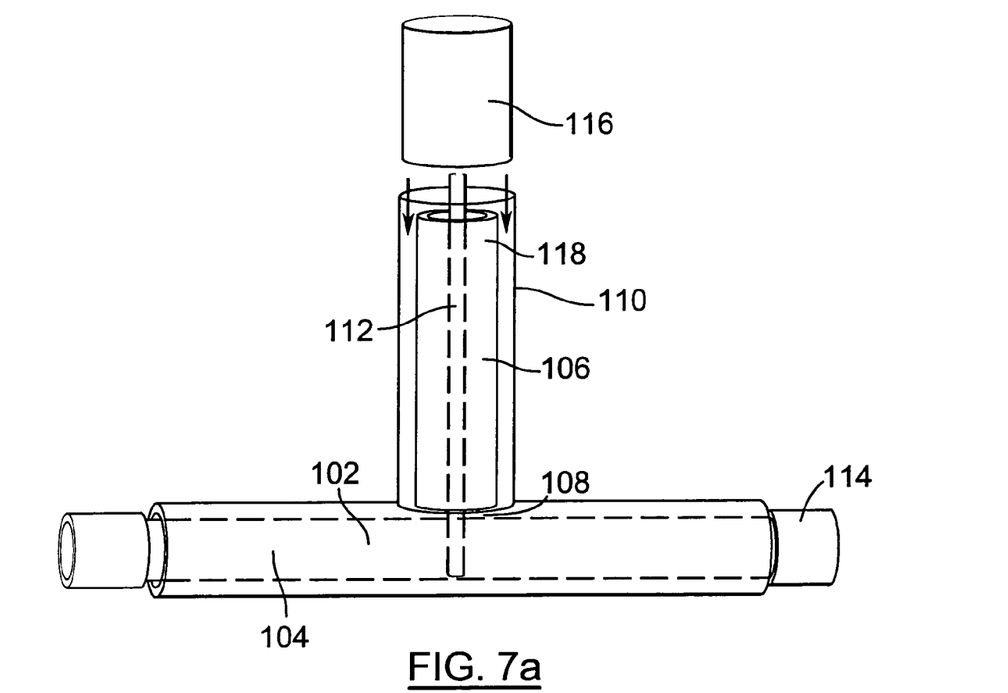
FIGS. 7a to 7f are side views showing preparation of a liner assembly for installation into a T-junction within a pipeline.
Figure 7B:
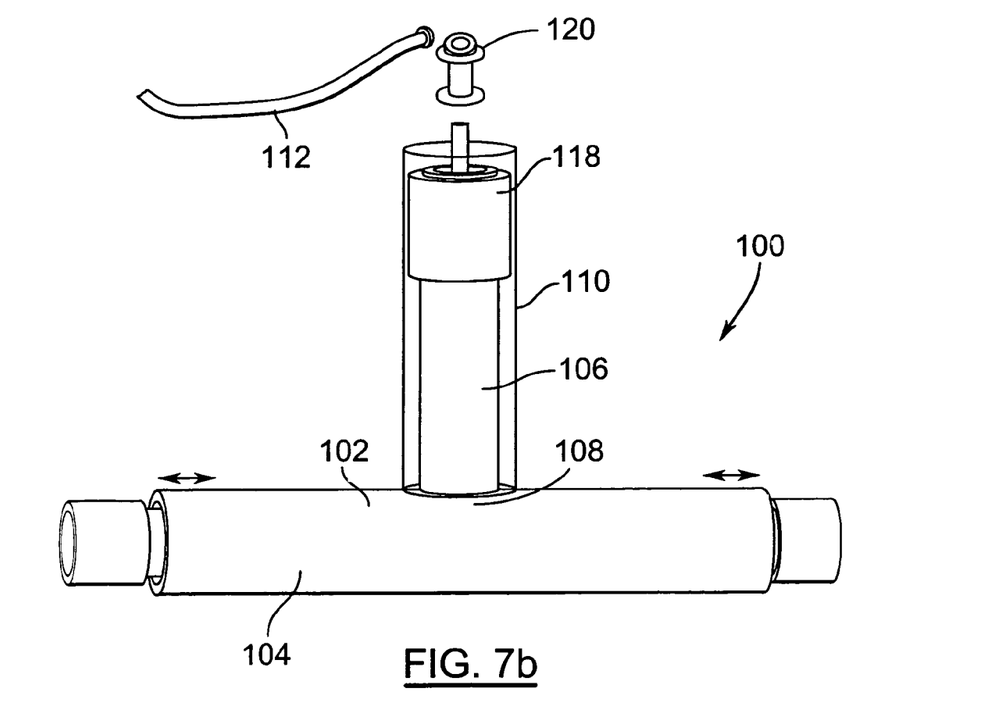
Figure 7C:
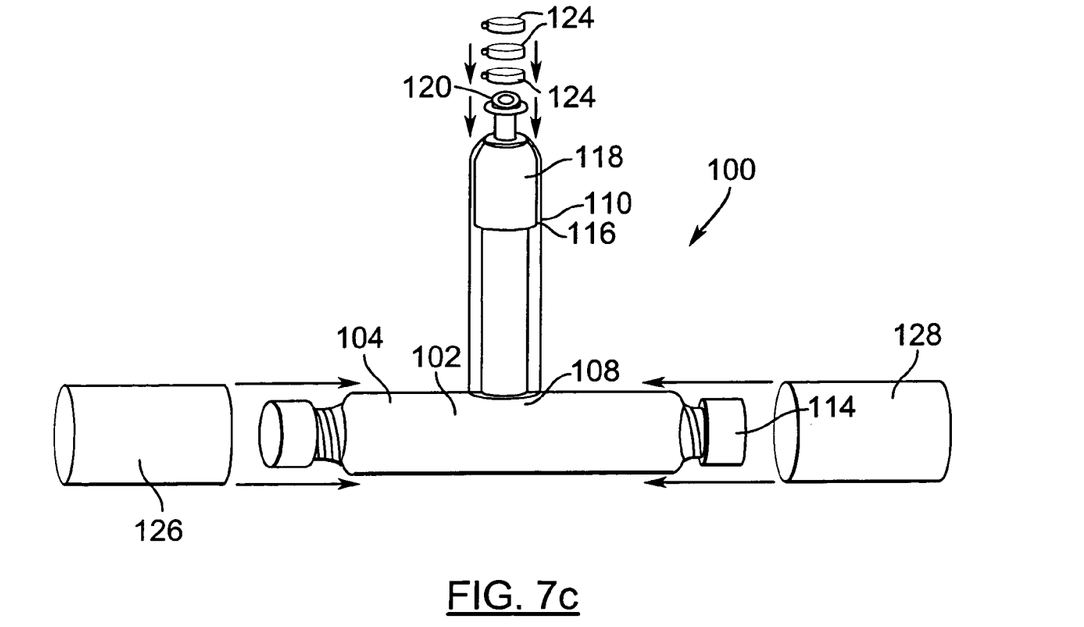
Figure 7D:
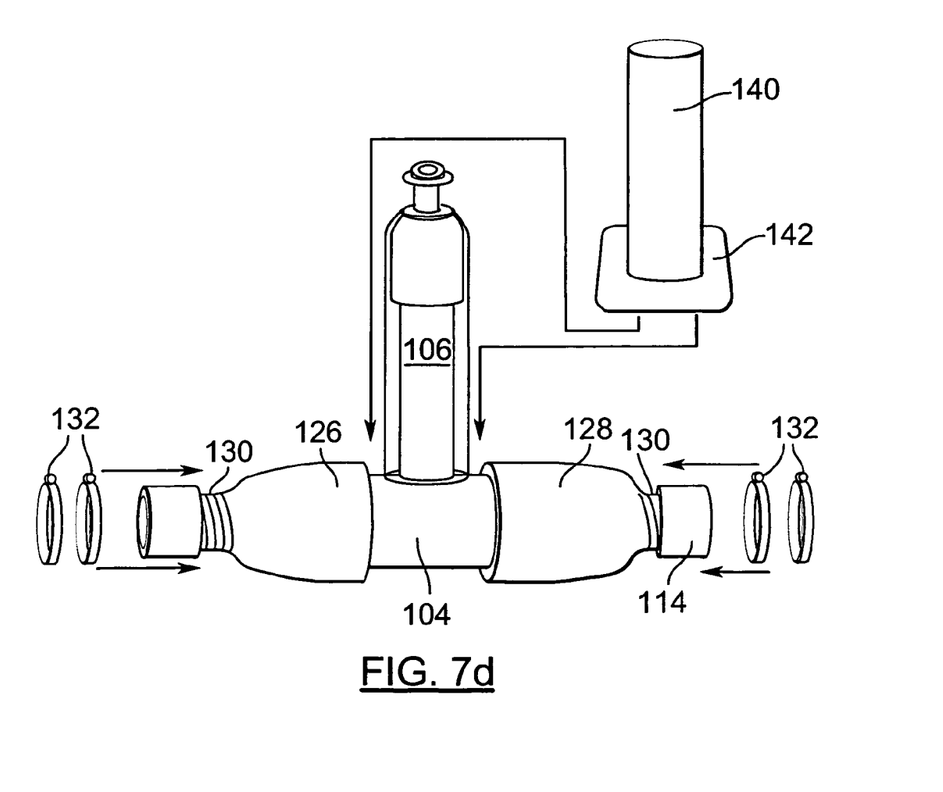
Figure 7E:
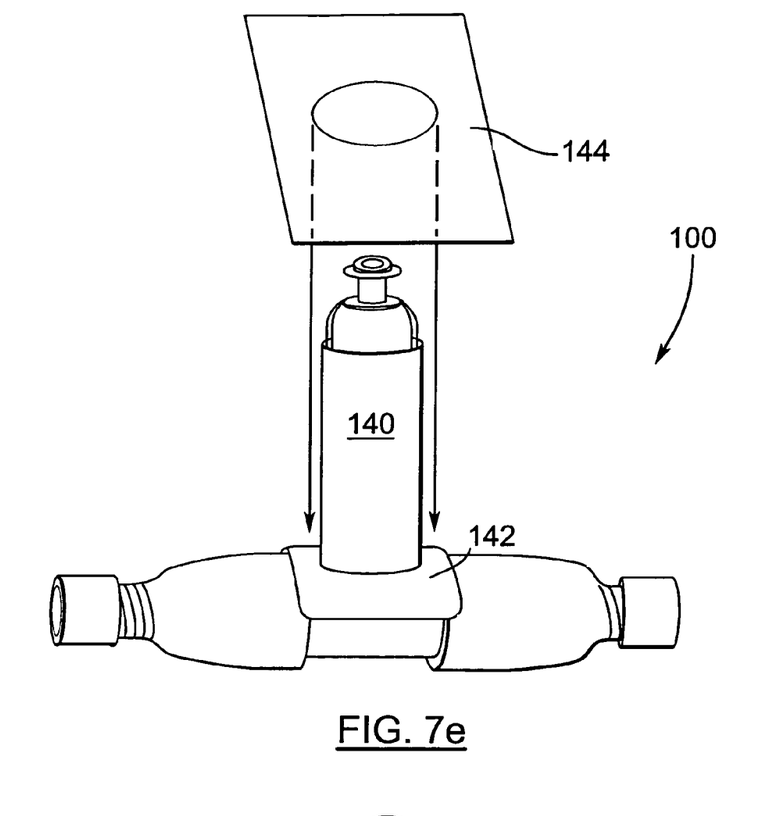
Figure 7F:
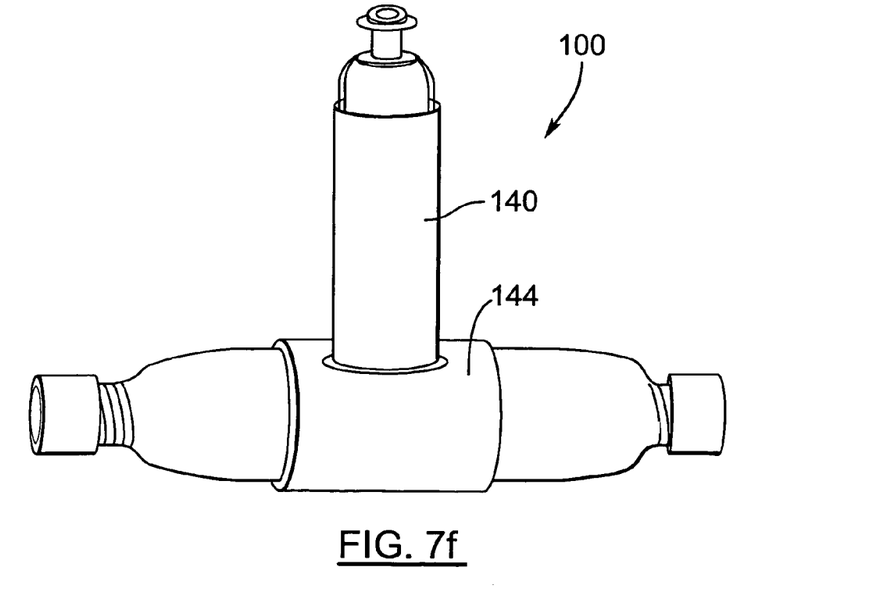

FIGS. 7a through 7f show the T-shaped bladder assembly 102 being prepared for installation. FIG. 7a shows the insertion of a retaining sleeve 116 on end portion 118 of the lateral portion 106. To facilitate positioning, the end portion 118 is further fitted with a pull block 120 (see FIG. 7b) adapted to be coupled to an installation cable 122 and winch (not shown). The lateral portion 106 of the inflatable bladder and the surrounding release plastic 110 is subsequently folded in or cinched (as shown in FIG. 7c), onto the pull block 120, ensuring a generally tight fit, sufficient to allow inflation of the T-shaped bladder assembly 102 later in the procedure. Note that strap 112 is tightly incorporated into the folds of the cinched lateral portion 106, thereby restricting the extent of longitudinal stretching in lateral portion 106 by limiting the distance between end portion 118 and the flow-through carrier 114 to which the strap 112 is fused. As shown in FIGS. 7c and 7d, preparation of the lateral portion 106 further comprises the placement of suitable clamps 124 (i.e. gear clamps) to ensure a tight fit around the pull block positioned therein.

As shown in FIGS. 7c and 7d, each end of the main portion 104 receives a non-stretchable retaining sleeve 126, 128 so as to prevent radial overexpansion of the bladder assembly upon inflation. This arrangement is then sealed to the respective ends of the flow-through carrier 114 extending therethrough using tape 130 and suitable clamps 132.

With the lateral portion 106 and the main portion 104 prepared for installation, the liner segments can be placed into position on the T-shaped bladder assembly. Note that all liner segments are wetted (i.e. impregnated with resin) prior to installation. As shown in FIG. 7d, the lateral liner segment 140 is placed over the lateral portion 106. To ensure a complete transition to the main portion of the pipeline, the lateral liner segment 140 is provided with a flange 142. To complete the liner assembly, a mainline segment 144 is then placed into position. The mainline segment 144 is configured to cover the flange 142 of the lateral liner segment 140 and envelop the main portion 104. As such, a complete lateral to mainline transition is achieved. To complete the preparation, an installation cable 134 is attached to the leading end 114a of the flow-through carrier 114 and extends to a winch (not shown). A retrieval cable 136 is attached to the training end 114b of the flow-through carrier 114 and extends to a winch (not shown). A hose 138 having one end coupled to a fluid source such as an air pump (not shown) extends through the flow-through carrier 114 and is in fluid communication with the internal area of the bladder assembly via a valve (not shown).

Figure 8:
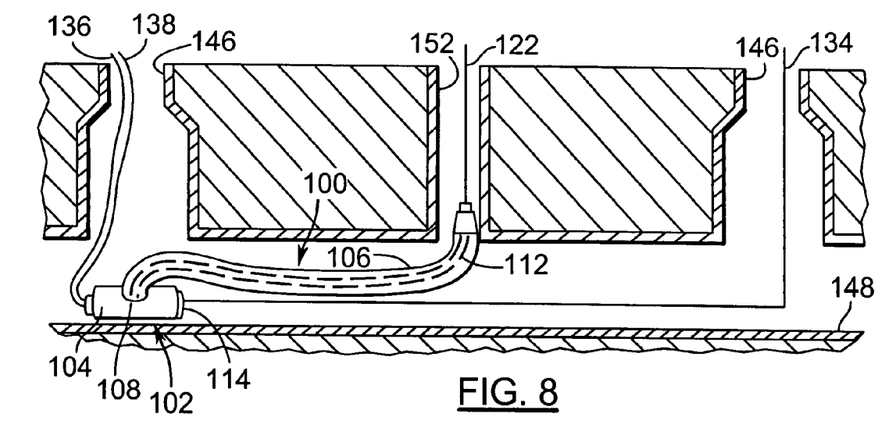
FIG. 8 is a side view, partly in section, showing installation of the liner assembly of FIGS. 7a to 7f into a T-junction within a pipeline.
Figure 9:
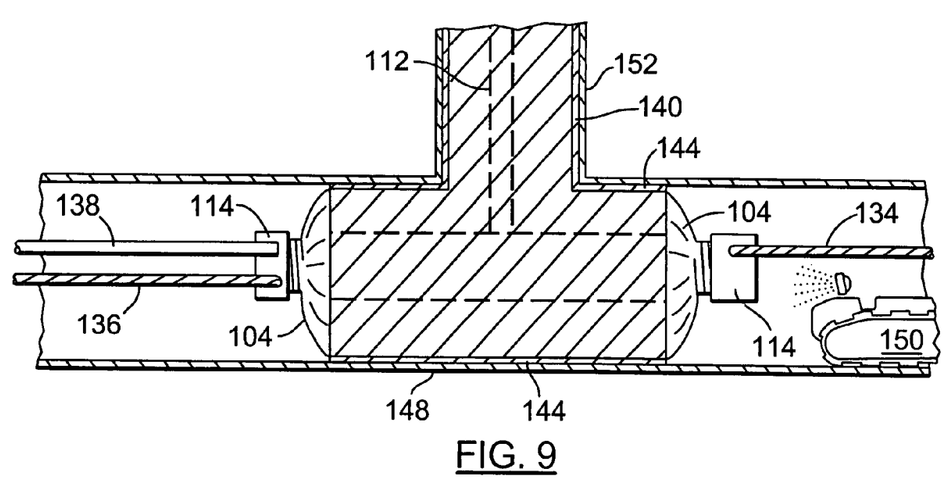
FIG. 9 is an enlarged side view of a portion of FIG. 8 during liner assembly position inspection.
Figure 10:
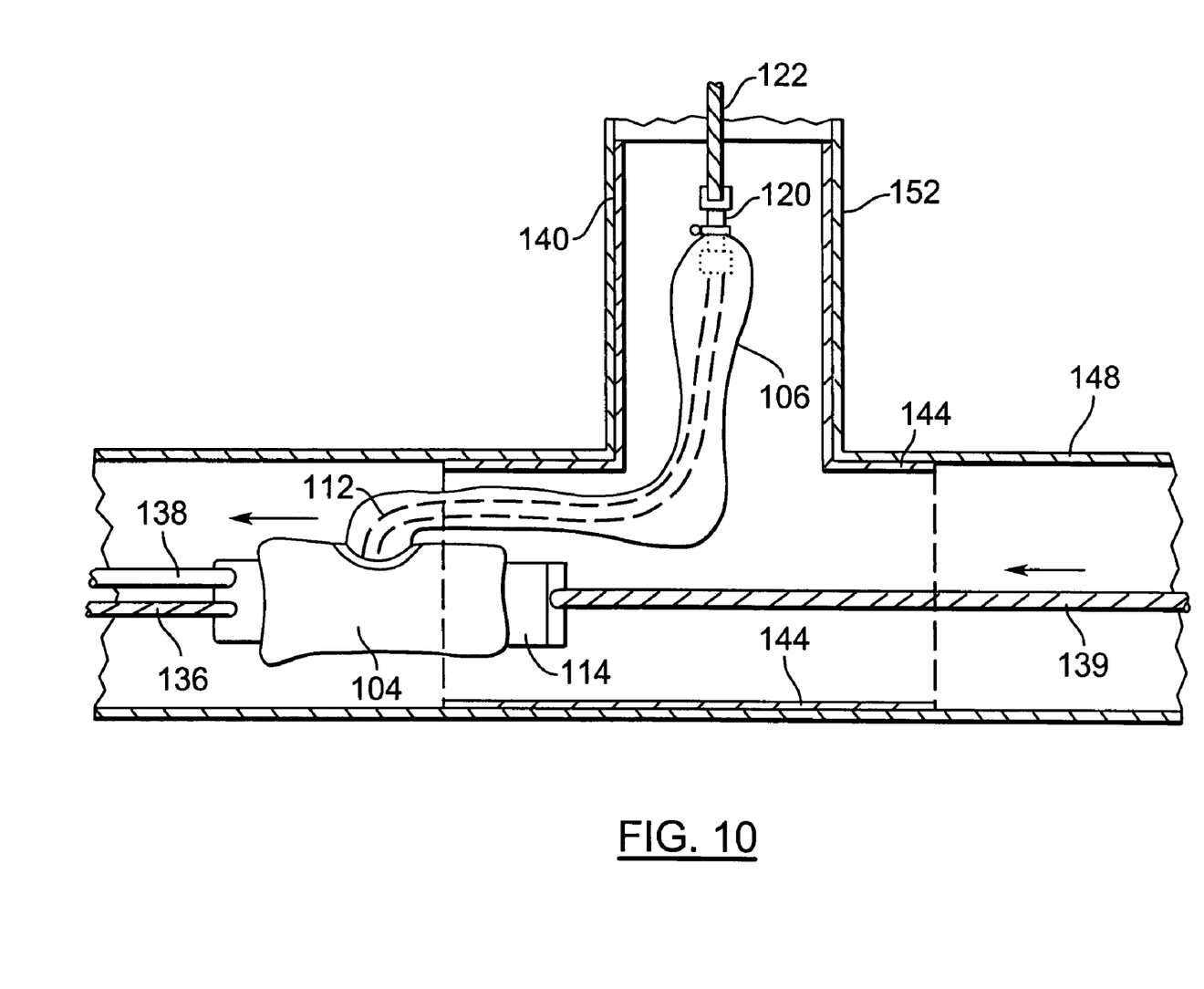
FIG. 10 is an enlarged side view of a portion of FIG. 8 during liner assembly retrieval.

Turning now to FIGS. 8 to 10, installation of the T-shaped bladder assembly 102 into a pipeline having a T-junction will be described. With the liner assembly prepared for installation, the liner assembly 100 is launched through a manhole 146 and into a main pipe 148. A remote controlled camera 150 may also be placed in the main pipe 148. The installation cable 122, which has been previously fed through a lateral pipe 152 that is connected to the main pipe 148 to define the T-junction to be repaired and/or reinforced, is then used to pull the lateral portion 106 of the bladder assembly 102 into the main pipe 148. Once the full length of the lateral portion 106 of the bladder assembly 102 is in the main pipe 148, the installation cables 122 and 134 are pulled simultaneously. Pulling of the installation cable 134 advances the flow-through carrier 114 and hence bladder assembly 102 towards the T-junction defined by the main and lateral pipes 148 and 152 respectively. Pulling of the installation cable 122 advances the lateral portion 106 of the bladder assembly 102 up into the lateral pipe 152. During this stage, the remote controlled camera 150 is used by the technicians to assist in the proper positioning of the liner at the T-junction as shown in FIG. 9.

With the liner assembly 100 properly positioned at the T-junction, the air pump is operated to feed air into the hose 138. Air fed into the hose 138 enters the bladder assembly 102 until both the lateral portion 106 and main portion 104 are inflated so as to force the lateral liner segment 140 and mainline liner segment 144 into contact with the interior surfaces of the main and lateral pipes 148 and 152 as shown in FIG. 9. As in the previous embodiments, the bladder assembly 102 is maintained in this condition until the liner cures.

Following curing of the liner, the air pump is operated to evacuate air from the bladder assembly 102, allowing the lateral portion 106 and main portion 104 to deflate (See FIG. 10). Once deflated, the retrieval cable 136 is pulled to remove the flow-through carrier 114 and attached bladder assembly 102 from the cured-in-place liner. With the bladder assembly 102 and flow-through carrier 114 separated from the liner, the retrieval cable 136 is pulled until the assembly is removed from the pipeline via the manhole 146.

Although the liner assembly 100 is shown for use in installing a liner at a T-junction between a lateral pipe and a main pipe, those of skill in the art will appreciate that the installation system can be used to install liners in other types of pipe junctions.

It will be appreciated from the above description that the non-stretchable strap and non-stretchable retaining sleeves serve to control the expansion of the malleable inflatable bladder. The strap is used to prevent longitudinal over-expansion of the inflatable bladder during both installation and inflation, while the retaining sleeves serve to prevent radial over-expansion (i.e. ballooning) at respective ends of the liner assembly. As indicated above, while the strap and retaining sleeves are generally manufactured from woven nylon or vinyl, suitable non-stretchable alternatives may also be used to achieve the desired expansion control.

Although preferred embodiments of the present invention have been described, those of skill in the art will appreciate that variations and modifications may be made without departing from the spirit and scope thereof as defined by the appended claims.

What is claimed is:

1. A liner assembly for pipeline repair comprising:
an outer tubular liner;

an inner malleable inflatable bladder positioned longitudinally within said outer liner;

a generally non-stretchable strap extending longitudinally within the inner bladder, said strap being configured to restrict longitudinal over-expansion of the liner assembly during positioning of the liner assembly within a pipeline and subsequent inflation of the inner bladder; and a pair of substantially non-stretchable retaining sleeves, each retaining sleeve being positioned adjacent an opposite end of said liner assembly, each retaining sleeve surrounding said inner bladder and being positioned between said outer liner and said inner bladder, said retaining sleeves being configured to prevent radial over-expansion of the liner assembly during inflation of the inner bladder.

2. The liner assembly of claim 1, further comprising a protective sheath surrounding said outer liner.

3. The liner assembly of claim 2, wherein said protective sheath is fitted to the outer circumference of the outer liner.

4. The liner assembly of claim 2, wherein said protective sheath comprises an elongate sheet having a first longitudinal edge and an opposite second longitudinal edge, said sheet being folded to overlap said second longitudinal edge and said first longitudinal edge.

5. The liner assembly of claim 4, wherein the overlapping first and second longitudinal edges are tack welded.

6. The liner assembly of claim 1, further comprising a release layer positioned between said outer liner and said inner bladder.

7. The liner assembly of claim 1, wherein said strap is formed of vinyl.

8. The liner assembly of claim 1 further comprising:
a pull block inserted into one end of the liner assembly, allowing for a pulling device to be attached to the liner assembly; and
an inflation block inserted into a second opposite end of the liner assembly, allowing for inflation of the inner bladder.

9. The liner assembly of claim 8, wherein each of said retaining sleeves is made of vinyl.

10. The liner assembly of claim 1, wherein each of said retaining sleeves is made of vinyl.

11. The liner assembly of claim 10, wherein said strap is formed of vinyl.

12. The liner assembly of claim 11, further comprising a release layer positioned between said outer liner and said inner bladder.

13. The liner assembly of claim 12 further comprising:
a pull block inserted into one end of the liner assembly, allowing for a pulling device to be attached to the liner assembly; and
an inflation block inserted into a second opposite end of the liner assembly, allowing for inflation of the inner bladder.

14. The liner assembly of claim 13, further comprising a protective sheath surrounding said outer liner.

15. The liner assembly of claim 11 further comprising:
a pull block inserted into one end of the liner assembly, allowing for a pulling device to be attached to the liner assembly; and
an inflation block inserted into a second opposite end of the liner assembly, allowing for inflation of the inner bladder.

16. The liner assembly of claim 15, further comprising a protective sheath surrounding said outer liner.

17. The liner assembly of claim 15 wherein said liner assembly is folded longitudinally over itself and further comprises a plurality of releasable retaining members at spaced locations generally along the length of said liner assembly to maintain the liner assembly in the folded condition when said inner bladder is deflated.

18. The liner assembly of claim 17 wherein each of said releasable retaining members encircles said liner assembly.

19. The liner assembly of claim 18 wherein opposite ends of said liner assembly are bound so that the opposite ends of said liner assembly taper in an outward direction.

20. The liner assembly of claim 15 wherein opposite ends of said liner assembly are bound so that the opposite ends of said liner assembly taper in an outward direction.

21. The liner assembly of claim 1 wherein said liner assembly is folded longitudinally over itself and further comprises a plurality of releasable retaining members at spaced locations generally along the length of said liner assembly to maintain the liner assembly in the folded condition when said inner bladder is deflated.

22. The liner assembly of claim 21 wherein each of said releasable retaining members encircles said liner assembly.

23. The liner assembly of claim 21 wherein opposite ends of said liner assembly are bound so that the opposite ends of said liner assembly taper in an outward direction.

24. The liner assembly of claim 1 wherein opposite ends of said liner assembly are bound so that the opposite ends of said liner assembly taper in an outward direction.

* * * * *